A. L. ELDEN.
DIRECT CURRENT ELECTRIC MOTOR.
APPLICATION FILED AUG. 24, 1918.
1,386,609.
Patented Aug. 9, 1921.
2 SHEETS—SHEET 1.
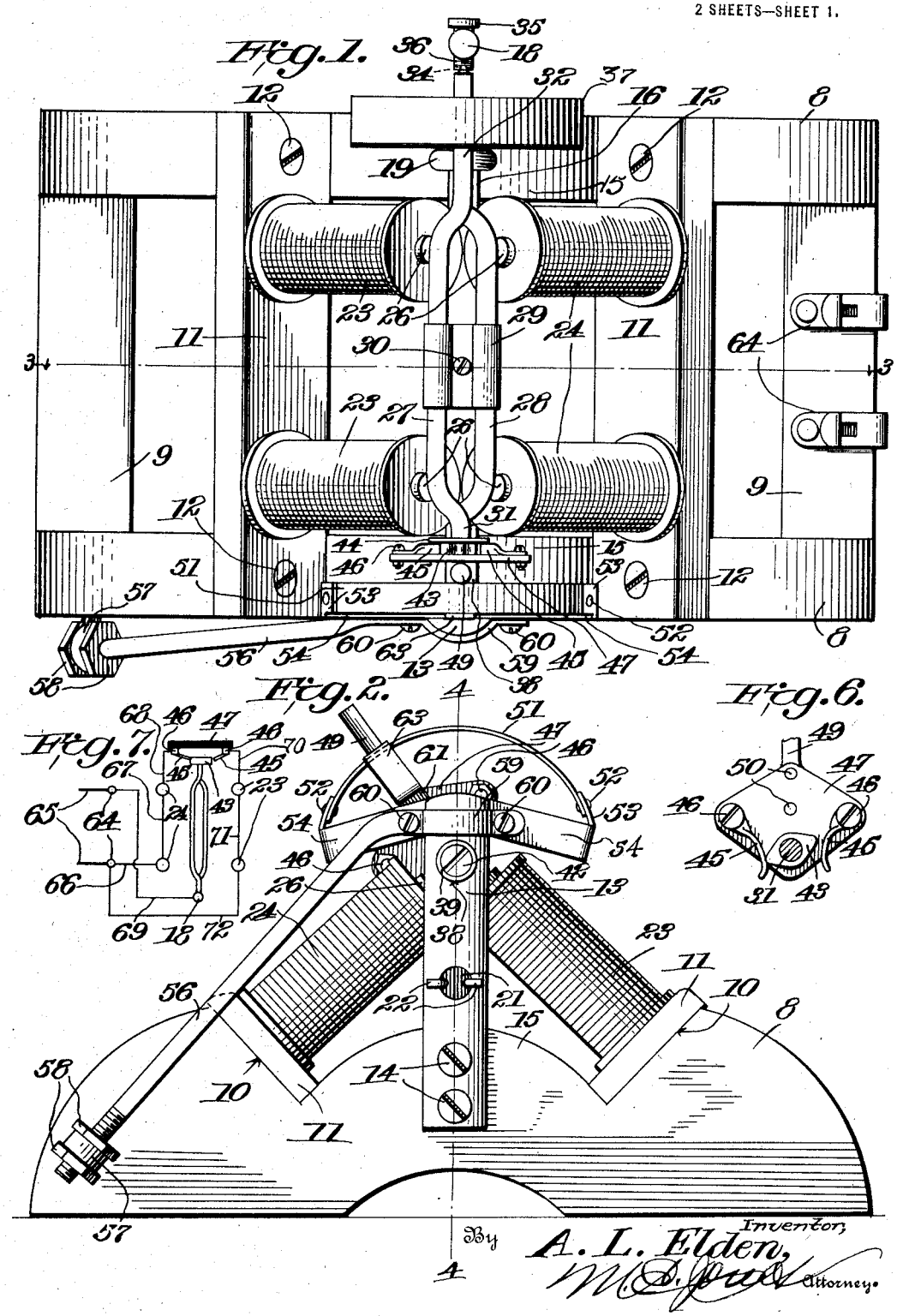
Inventor,
A. L. Elden,
By [signature] Attorney.

A. L. ELDEN.
DIRECT CURRENT ELECTRIC MOTOR.
APPLICATION FILED AUG. 24, 1918.
1,386,609.
Patented Aug. 9, 1921.
2 SHEETS—SHEET 2.
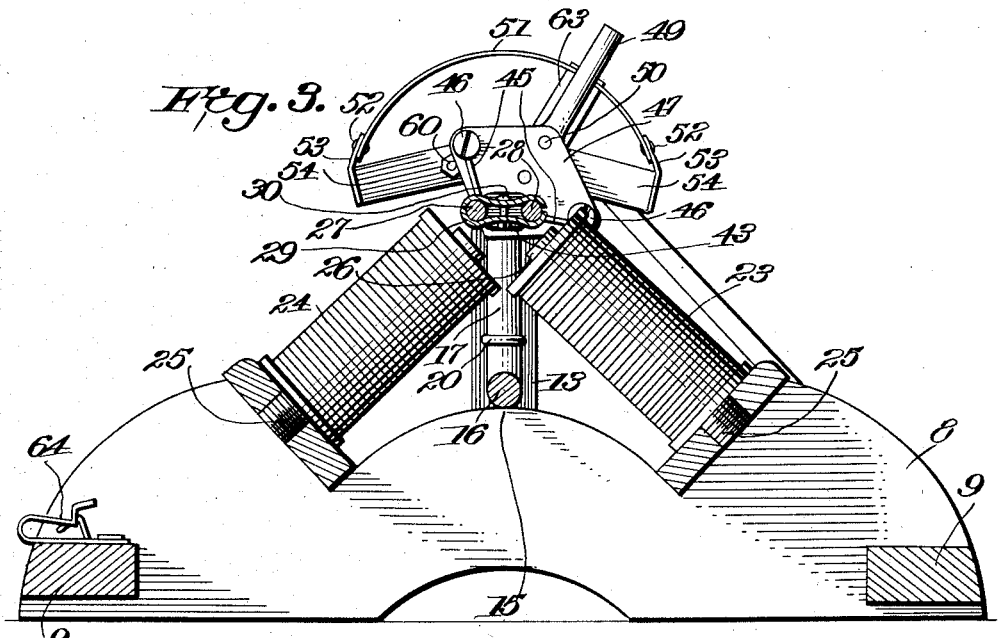
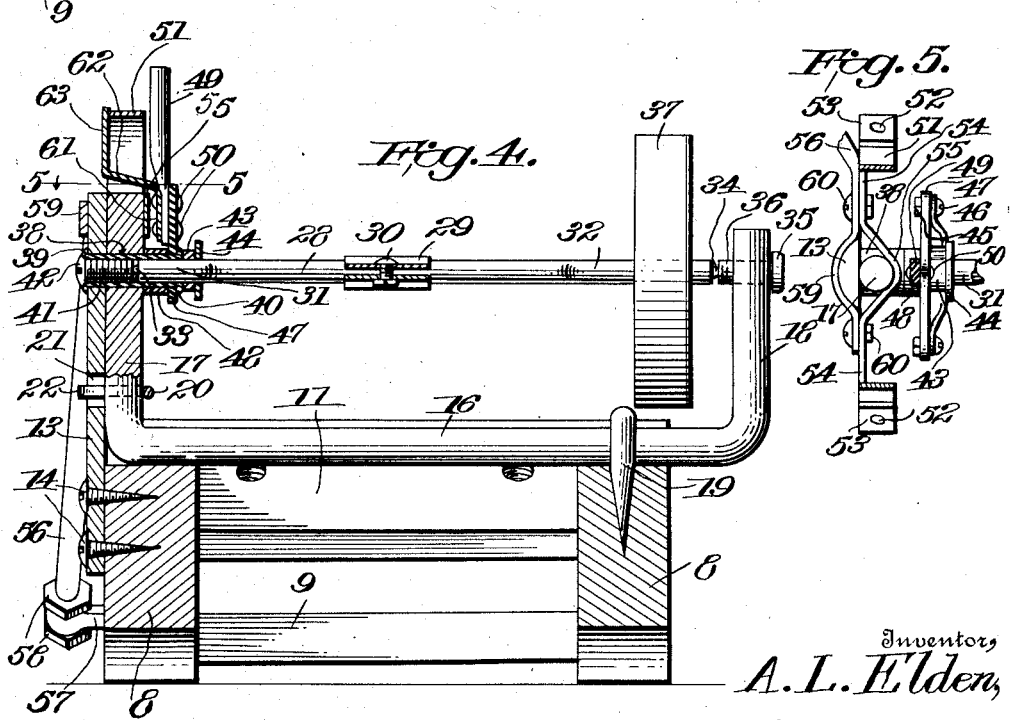
Inventor,
A. L. Elden,
By
Attorney.

UNITED STATES PATENT OFFICE.

ALF L. ELDEN, OF ALVARADO, MINNESOTA.

DIRECT-CURRENT ELECTRIC MOTOR.

1,386,609.  Specification of Letters Patent.  Patented Aug. 9, 1921.

Application filed August 24, 1918. Serial No. 251,260.

*To all whom it may concern:*

Be it known that I, ALF L. ELDEN, a citizen of the United States, residing at Alvarado, in the county of Marshall and State of Minnesota, have invented certain new and useful Improvements in Direct-Current Electric Motors, of which the following is a specification.

While the invention aims to generally improve and simplify a motor of this type so that it will be efficient and capable of manufacture at low cost, yet I particularly aim to provide a very light weight armature; an armature which does not require winding; a motor in which there is little danger of short circuiting or overheating; one having a simple form of commutator and particularly a commutator made in a single piece; a motor having a commutator in which the formation of short circuits is avoided; and a motor in which the magnets do not have to be proportioned to the armature winding.

With the above and additional objects, and advantages which will appear hereinafter, the invention has been embodied in one practical form as illustrated in the accompanying drawings, and wherein:

Figure 1 is a top or plan view;

Fig. 2 is a side elevation;

Fig. 3 is a longitudinal sectional view on the line 3—3 of Fig. 1;

Fig. 4 is a cross sectional view on the line 4—4 of Fig. 2;

Fig. 5 is a cross sectional view on the line 5—5 of Fig. 4;

Fig. 6 is a fragmentary view showing the relation of the commutator and its brushes, and Fig. 7 is a diagrammatic view of the electrical wiring.

Referring specifically to the drawings, the operating parts of the motor are preferably mounted on a suitable base. The suggested form illustrated in the drawings, comprises sills or sides 8 spaced apart and joined by bridges 9. The sills are provided with inclined walls at 10 in order to mount supporting plates or bars 11 at the angle shown. These bars 11 rest against the walls 10 and may be fastened against the same in any suitable manner as for instance by means of screws 12.

A post 13 is fastened to one of the sills 8 in any suitable way, as by means of screws 14, and projects above the sill as shown in Figs. 2, 3 and 4.

Resting on arches 15 of the sills 8 is the horizontal portion 16 of a bearing which has upstanding bearing portions 17 and 18 at opposite ends. A staple or other fastening means 19 is preferably driven into one of the sills 8, which for this purpose may be made of wood, and in straddling relation over the portion 16. Another staple 20 may straddle the bearing portion 17 and have its terminals pass through an opening 21 of the post 13 and clenched against the exterior thereof as at 22. (See Fig. 2.)

Electromagnets 23 and 24 are employed, being disposed at the same angle as the bars 11 and being fastened thereto as by means of screw threaded studs 25. The cores 26 of these electromagnets, coöperate with spaced parallel arms 27 and 28 forming an armature. The armature of course may be of any suitable construction and it is therefore to be understood that the one illustrated is by way of example only. Arm 28 is formed separate from the arm 27 but is fastened thereto by means of a split clamp 29, the blades or arms of which are secured against the arms by a bolt 30. Arm 27 has alined shaft extensions 31 and 32 and from the ends thereof respectively extend cone shaped trunnions 33 and 34. (See Fig. 4.) A bearing 35 has an exteriorly screw threaded shank 36 which is screwed into the bearing 18 and the inner end of which is provided with a socket in which the trunnion 34 is journaled. Also, on the shaft portion 32, a fly wheel 37 may be keyed or otherwise fastened. A sleeve 38 surrounds shaft portion 31 and extends through suitable openings in the bearing 17 and post 13. At 39, sleeve 38 is clenched against the post 13 and at 40, the opposite end of the sleeve is bent into a laterally extending flange. Shaft 31 is journaled in the sleeve 38 and the trunnion 33 extends into a socket provided in a shank 41 having screw threads engaging screw threads on the interior of sleeve 38. Shank 41 may form part of a set screw if desired and have a head 42.

A one-piece metallic commutator 43 is rigidly mounted on the shaft portion 31 and rigid with the commutator and shaft, is a guard plate 44 which serves to maintain brushes 45 in proper relation therewith. These brushes 45 are suitably fastened, as by means of set screws 46 to a segment or plate 47 of insulating material, journaled on the sleeve 38 as shown in Fig. 4. A short spacing sleeve 48 surrounds sleeve 38 intermediate the bearing 17 and segment 47 to prevent movement of the segment longitudinally of the bearing in one direction. In the other direction, longitudinal movement of the segment is prevented by the flange 40. Plate 47 is so journaled as to remain in any position to which it is adjusted, due to frictional contact at the opening with the sleeve 38. A manipulating handle 49 is riveted or otherwise fastened at 50 to the segment 47.

A suitable frame is provided having an arcuate rim 51 riveted or otherwise fastened at 52 to lugs 53 rising from arms 54. At the junction of arms 54, they are bowed as at 55, see Figs. 4 and 5, so as to surround the bearing 17. A brace rod, preferably diagonally disposed, is provided for the post 13 at 56. At the lower end, this rod extends through a bracket 57 projecting laterally from one of the sills 8. On opposite sides of bracket 57, nuts 58 engage the screw threads provided on the rod. At the upper end, the rod terminates in a horizontally extending clamp arm 59 which extends across and in contact with the exterior of the post 13. Fastening bolts or other means 60 pass through the arm 59 and arms 54 to tightly clamp the frame and brace to the post.

The segment 47 is further braced by means of an arm 61, secured thereto as by means of the rivets 50. An outwardly extending arm 62 forms part of this brace being adapted in its movement with the segment to abut the tops of the arms 54 to limit movement of the segment, as shown in Fig. 2. An upstanding arm 63 rises from the arm 62 and engages the outer edge of the rim 51.

Electric feed wires, running from any suitable source of direct current, may be fastened to terminals 64 secured to one of the bridges 9. Any suitable form of terminal may be used as is obvious.

Referring now to the wiring diagram of Fig. 7, the feed wires for the terminal 64 are shown at 65. From one of the terminals 64 a wire or conductor 66 leads to one of the electromagnets 24 and from that magnet a conductor 67 leads to the other electromagnet 24 from which a conductor 68 leads to one of the set screws 46, which should therefore be of conducting material. The current then passes through one brush 45 to the commutator and armature, returning to the battery through the bearing 35 which should be of conducting material, and arms 18 and 16 which should also be of conducting material and from either of which conductor wire 69 returns to the other terminal 64. The circuit described energizes the electromagnets 24. In energizing the electromagnets 23, the current is supplied through the feeds 65, one of the terminals 64, conductor 69, portion 16, bearing 18, bearing 36, the armature, the commutator, and through the other brush 45 and set screw 46, which is a conductor, to a conducting wire 70 leading to one of the magnets 23 and from which a conductor 71 leads to the other magnet 23 and from which a conductor 72 returns to the other terminal 64.

It will be realized that upon electrical energy being supplied to the feed wires 65, the magnets 23 and 24 will be alternately energized, and attract the arms of the armature 27—28, thus causing the armature to rotate. The segment 47 and brushes 45 are made adjustable on the sleeve 38 so that they may be moved to reverse the direction of flow of the armature current, in order to reverse the direction of rotation of the shaft. Attention should be called to the fact that the brushes 45 are in contact with the commutator 43, one at a time, as the commutator turns and as suggested at Fig. 6 in order to alternately make and break the circuit through the different sets of electromagnets. The power generated may be taken from the engine in any suitable manner, for instance, from either of the shaft portions 31 or 32.

It is also to be understood that I have shown and described merely one preferred embodiment, in view of which fact, such changes in principles, and details of construction, as fall within the spirit and scope of the appended claim, are reserved.

I claim:

An electric motor having electric circuit means, electromagnets therein, an armature coöperating with the magnets, said armature having a shaft provided with an outwardly extending portion to provide an arm, a separate arm spaced from said arm, a clamp to join said arms, said arms coöperating with the magnets, a commutator on the shaft, and said commutator being in the electric circuit means.

In testimony whereof, I have affixed my signature in the presence of two witnesses.

ALF L. ELDEN.

Witnesses:
I. N. LODOEN,
G. O. N. LODOEN.